United States Patent
Li et al.

(10) Patent No.: US 8,660,317 B2
(45) Date of Patent: Feb. 25, 2014

(54) OBJECT IMAGE DETECTION METHOD AND OBJECT IMAGE DETECTION DEVICE FOR DETECTING AN OBJECT IMAGE FROM AN INPUT IMAGE

(75) Inventors: Tao Li, Beijing (CN); Haike Guan, Kanagawa (JP); Gang Wang, Beijing (CN); Zhongchao Shi, Beijing (CN); Cheng Du, Beijing (CN)

(73) Assignee: Ricoh Company, Ltd., Tokyo (JP)

(*) Notice: Subject to any disclaimer, the term of this patent is extended or adjusted under 35 U.S.C. 154(b) by 1341 days.

(21) Appl. No.: 12/076,612

(22) Filed: Mar. 20, 2008

(65) Prior Publication Data

US 2008/0253664 A1 Oct. 16, 2008

(30) Foreign Application Priority Data

Mar. 21, 2007 (CN) .......................... 2007 1 0087885

(51) Int. Cl.
*G06K 9/00* (2006.01)
(52) U.S. Cl.
USPC .......................................... 382/115; 382/224
(58) Field of Classification Search
USPC .................................................. 382/115, 224
See application file for complete search history.

(56) References Cited

U.S. PATENT DOCUMENTS

| | | | |
|---|---|---|---|
| 6,549,646 B1* | 4/2003 | Yeh et al. ...................... | 382/132 |
| 7,016,881 B2 | 3/2006 | Li et al. | |
| 7,024,033 B2 | 4/2006 | Li et al. | |
| 7,050,607 B2 | 5/2006 | Li et al. | |
| 7,099,505 B2 | 8/2006 | Li et al. | |
| 2003/0099395 A1* | 5/2003 | Wang et al. ................... | 382/165 |
| 2004/0096100 A1* | 5/2004 | Ii et al. ........................ | 382/159 |
| 2005/0102246 A1 | 5/2005 | Movellan et al. | |
| 2006/0120572 A1 | 6/2006 | Li et al. | |
| 2006/0120604 A1 | 6/2006 | Kim et al. | |
| 2006/0204110 A1 | 9/2006 | Steinberg et al. | |

FOREIGN PATENT DOCUMENTS

| | | |
|---|---|---|
| EP | 1 727 087 | 11/2006 |
| JP | 11-015973 | 1/1999 |
| JP | 2003-036439 | 2/2003 |
| JP | 2005-044330 | 2/2005 |
| JP | 2006-331266 | 12/2006 |

OTHER PUBLICATIONS

Extended Search Report for corresponding European Patent Application No. 08250996.9 dated Dec. 15, 2010.

(Continued)

*Primary Examiner* — Hadi Akhavannik
(74) *Attorney, Agent, or Firm* — Harness, Dickey & Pierce, P.L.C.

(57) ABSTRACT

An object image detection device is disclosed that is able to rapidly detect an object image from an input image without a great deal of computation. The object image detection device includes an object image classification unit for determining whether the object images are included in an image having a given orientation, an image orientation detection unit for detecting orientation of the input image, an image rotation unit for rotating the object image classification unit according to the detected orientation of the input image, and a detection unit for detecting the object images from the input image by using the rotated object image classification unit.

20 Claims, 11 Drawing Sheets

(56) References Cited

OTHER PUBLICATIONS

Yong Ma et al., "Real-Time Rotation Invariant Face Detection Based on Cost-Sensitive Adaboost," Proceedings 2003 International Conference on Image Processing (Cat. No. 03CH37429), Barcelona, Spain, Sep. 14-17, 2003; [International Conference on Image Processing], IEEE Piscataway, NJ, USA, vol. 3, Sep. 14, 2003, pp. 921-924, XP010669985, ISBN: 978-0-7803-7750-9.

Yao Z. et al., "Tracking a Detected Face with Dynamic Programming," Image and Vision Computing, Elsevier, Guildford, GB, vol. 24, No. 6, Jun. 1, 2006, pp. 573-580, XP025135457, ISSN: 0262-8856, DOI: DOI:10.1016/J.IMAVIS.2005.09.007 [retrieved on Jun. 1, 2006].

Wu Bo et al., "Fast Rotation Invariant Multi-View Face Detection Based on Real Adaboost," Automatic Face and Gesture Recognition, 2004, Proceedings, Sixth IEEE International Conference on, IEEE, Piscataway, NJ, USA, May 17, 2004, pp. 79-84, XP010949414, ISBN: 978-0-7695-2122-0.

Chang Huang et al., "Omni-Directional Face Detection Based on Real Adaboost," Image Processing, 2004, ICIP '04, 2004 International Conference on Singapore Oct. 24-27, 2004, Piscataway, NJ, USA, IEEE, vol. 1, Oct. 24, 2004, pp. 593-596, XP010784887, DOI: DOI:10.1109/ICIP.2004.1418824, ISBN: 978-0-7803-8557-2.

Huang C. et al., "Boosting Nested Cascade Detector for Multi-View Face Detection," Proceedings—International Conference on Pattern Recognition—Proceedings of the 17th International Conference on Pattern Recognition, ICPR 2004 2004 Institute of Electrical and Electronics Engineers Inc., US, vol. 2, 2004, pp. 415-418, XP010724372.

Chang Huang et al., "Vector Boosting for Rotation Invariant Multi-View Face Detection," Computer Vision, 2005, ICCV 2005, Tenth IEEE International Conference on Beijing, China, Oct. 17-20, 2005, Piscataway, NJ, USA, IEEE, vol. 1, Oct. 17, 2005, pp. 446-453, XP010854821, DOI: DOI:10.1109/ICCV.2005.246 ISBN: 978-0-7695-2334-7.

Hongliang Bai et al., "Motion and Haar-Like Features Based Vehicle Detection," Multi-Media Modelling Conference Proceedings, 2006 12th International Beijing, China Jan. 4-6, 2006, Piscataway, NJ, USA, IEEE, Jan. 4, 2006, pp. 356-359, XP010926992, DOI: DOI:10.1109/MMMC.2006.1651348, ISNB: 978-1-4244-0028-7.

Lienhart R. et al., "An Extended Set of Haar-like Features for Rapid Object Detection," Proceedings of ICIP 2002 International Conference on Image Processing Sep. 22-25, 2002 Rochester, NY, USA, vol. 1, Sep. 22, 2002,-Sep. 25, 2002, pp. I-900, XP10607470, Proceedings 2002 International Conference on Image Processing (Cat. No. 02CH37396) IEEE Piscataway, NJ, USA, DOI: DOI:10.1109/ICIP.2002.1038171, ISBN: 0-7803-7622-6.

Office Action for related Japanese patent application No. 2008-072441 dated Oct. 18, 2011.

Office Action for related Japanese patent application No. 2008-072242 dated Oct. 4, 2011.

P. Viola et al.: "Robust Real-Time Face Detection", International Journal of Computer Vision, vol. 57, pp. 137-154, May 2004.

H. Schneiderman et al.: "A Statistical Method for 3D Object Detection Applied to Faces and Cars", Jan. 2000.

H. Rowley et al.: "Neural Network-Based Face Detection", IEEE Transactions on Pattern Analysis and Machine Intelligence, vol. 20, No. 1, Jan. 1998.

* cited by examiner

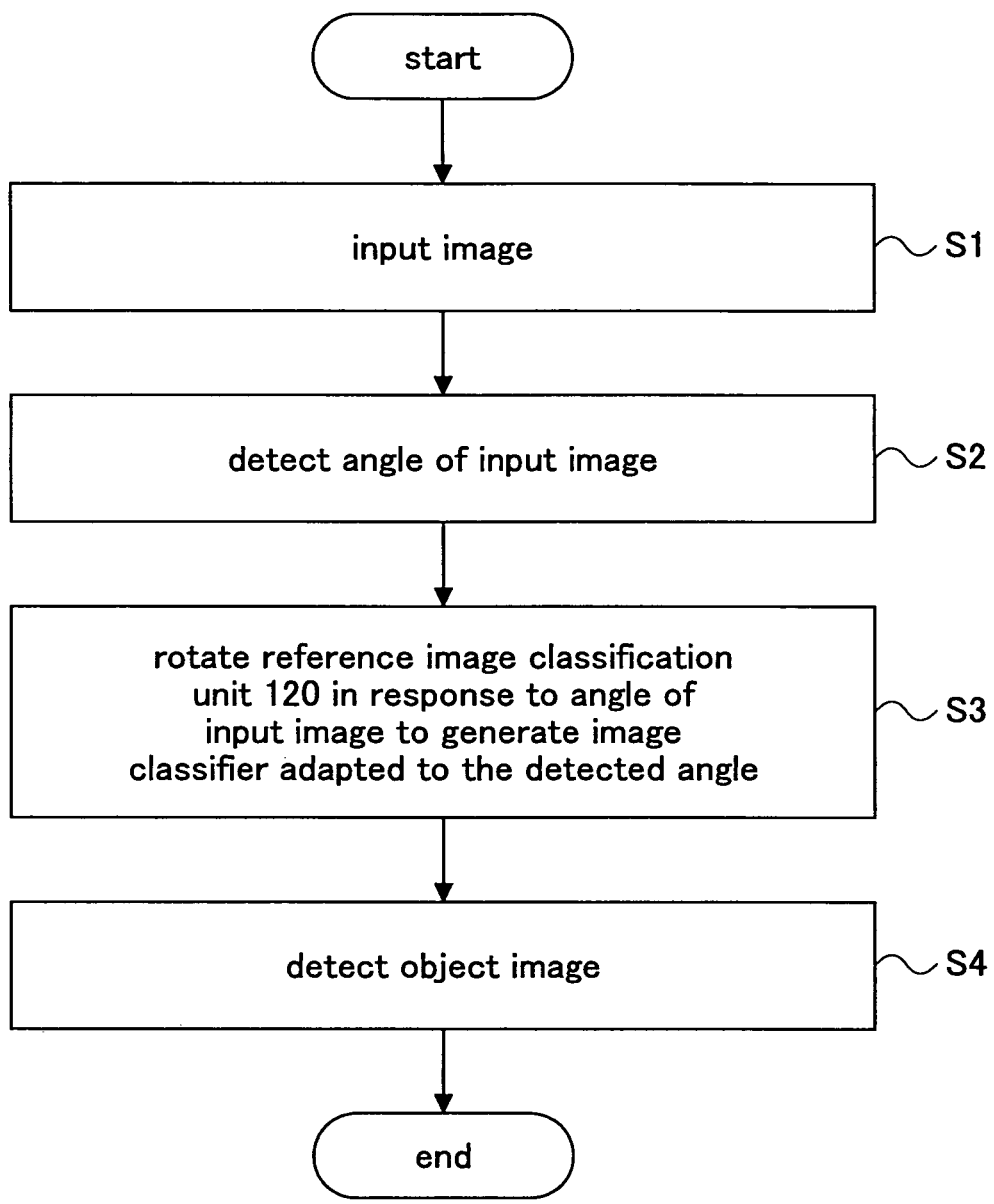

OBJECT IMAGE DETECTION METHOD AND OBJECT IMAGE DETECTION DEVICE FOR DETECTING AN OBJECT IMAGE FROM AN INPUT IMAGE

This patent application is based on and claims priority to Chinese Priority Patent Application No. 200710087885 filed on Mar. 21, 2007, the entire contents of which are hereby incorporated by reference.

BACKGROUND OF THE INVENTION

1. Field of the Invention

The present invention relates to image processing, and particularly, to an object image detection device and method able to detect an inclined object image from an input image.

2. Description of the Related Art

In recent years, usage of an object image detection technique has been widely spread. Here, the "object image detection technique" represents a technique of detecting objects such as faces or cars, from an image such as a picture, a still image, or a video image. Particularly, a face detection technique is widely used in digital cameras, security, and other fields for detecting positions, size, and other information of features of the faces. For example, considering a digital camera, the detection results are used for focusing, exposure, white color balance, or other adjustments of the faces.

When using a digital camera, depending on situations, a user may incline the digital camera and take pictures having different orientations relative to the monitor of the digital camera compared to a normal condition in which the monitor of the digital camera is not inclined but held in a horizontal direction. In this case, pictures inclined relative to the monitor of the digital camera are obtained.

FIG. 1A through FIG. 1C illustrate different orientations of the digital camera.

In FIG. 1A, the digital camera is held in the normal condition, namely, the digital camera is not inclined but in the horizontal direction.

In FIG. 1B, the digital camera is rotated by 90° counter-clockwise relative to the horizontal direction.

In FIG. 1C, the digital camera is rotated by 90° clockwise relative to the horizontal direction.

On the other hand, in image processing of an object image detection device installed in the digital camera, the origin of a coordinate system is fixed at a specified position of the monitor, for example, at the left-upper corner of the monitor. For this reason, when the digital camera is inclined to take pictures, the object image detection device receives face image signals having a different orientation from the image having the normal orientation.

FIG. 2A through FIG. 2C illustrate face images having different orientations.

The face images illustrated in FIG. 2A through FIG. 2C are taken with the digital camera having orientations as shown in FIG. 1A through FIG. 1C, respectively.

For example, the technique of detecting face images having different orientations is disclosed in U.S. patent application Ser. No. 11/299,504 (hereinafter, referred to as "reference 1"), and U.S. patent application Ser. No. 11/285,172 (hereinafter, referred to as "reference 2").

A general technique of detecting face images is disclosed in "Robust Real-Time Face Detection", P. Viola, M. J. Jones, International Journal of Computer Vision, vol. 57, pp. 137-154, May 2004 (hereinafter, referred to as "reference 3").

However, the technique of detecting face images disclosed in reference 1 and reference 2 requires a great deal of computation. On the other hand, portable digital devices like digital cameras have processors of low clock frequencies and memories of small capacities, thus lack sufficient computational capability. As a result, the face image detection technique in the related art cannot be applied directly.

SUMMARY OF THE INVENTION

The present invention may solve one or more problems of the related art.

A preferred embodiment of the present invention may provide an object image detection device and an object image detection method able to rapidly detect an inclined object image from an input image without a great deal of computation.

According to a first aspect of the present invention, there is provided an object image detection device for detecting one or more object images from an input image, comprising:

an object image classification unit configured to determine whether the object images are included in an image having a predetermined orientation;

an image orientation detection unit configured to detect orientation of the input image;

an image rotation unit configured to rotate the object image classification unit according to the detected orientation of the input image; and a detection unit configured to detect the object images from the input image by using the rotated object image classification unit.

Preferably, the image orientation detection unit detects the orientation of the input image by using one or more features of the object images.

Preferably, the object image classification unit includes a plurality of image classifiers arranged in cascade manner, the image rotation unit rotates at least a part of the image classifiers of the object image classification unit according to the detected orientation of the input image.

Preferably, the image orientation detection unit includes a plurality of direction identifiers each able to distinguish two angles from each other.

Preferably, the image orientation detection unit includes an integration section configured to integrate outputs of the direction identifiers.

Preferably, the image rotation unit rotates the object image classification unit by adjusting direction-sensitive parameters of the object image classification unit according to the detected orientation of the input image.

Preferably, the direction-sensitive parameters include positions of features of the object images.

According to the embodiments of the present invention, the image orientation detection unit detects the orientation of the input image, the image rotation unit rotates the object image classification unit according to the detected orientation of the input image, and the detection unit detects the object images from the input image by using the rotated object image classification unit. Since rotation of the object image classification unit does not require a large amount of computation, it is possible to rapidly detect object images without a great deal of computation.

These and other objects, features, and advantages of the present invention will become more apparent from the following detailed description of preferred embodiments given with reference to the accompanying drawings.

BRIEF DESCRIPTION OF THE DRAWINGS

FIG. 11 is a flowchart illustrating operations of the object image detection device 10.

DESCRIPTION OF THE PREFERRED EMBODIMENTS

Below, preferred embodiments of the present invention are explained with reference to the accompanying drawings.

Figure 3:
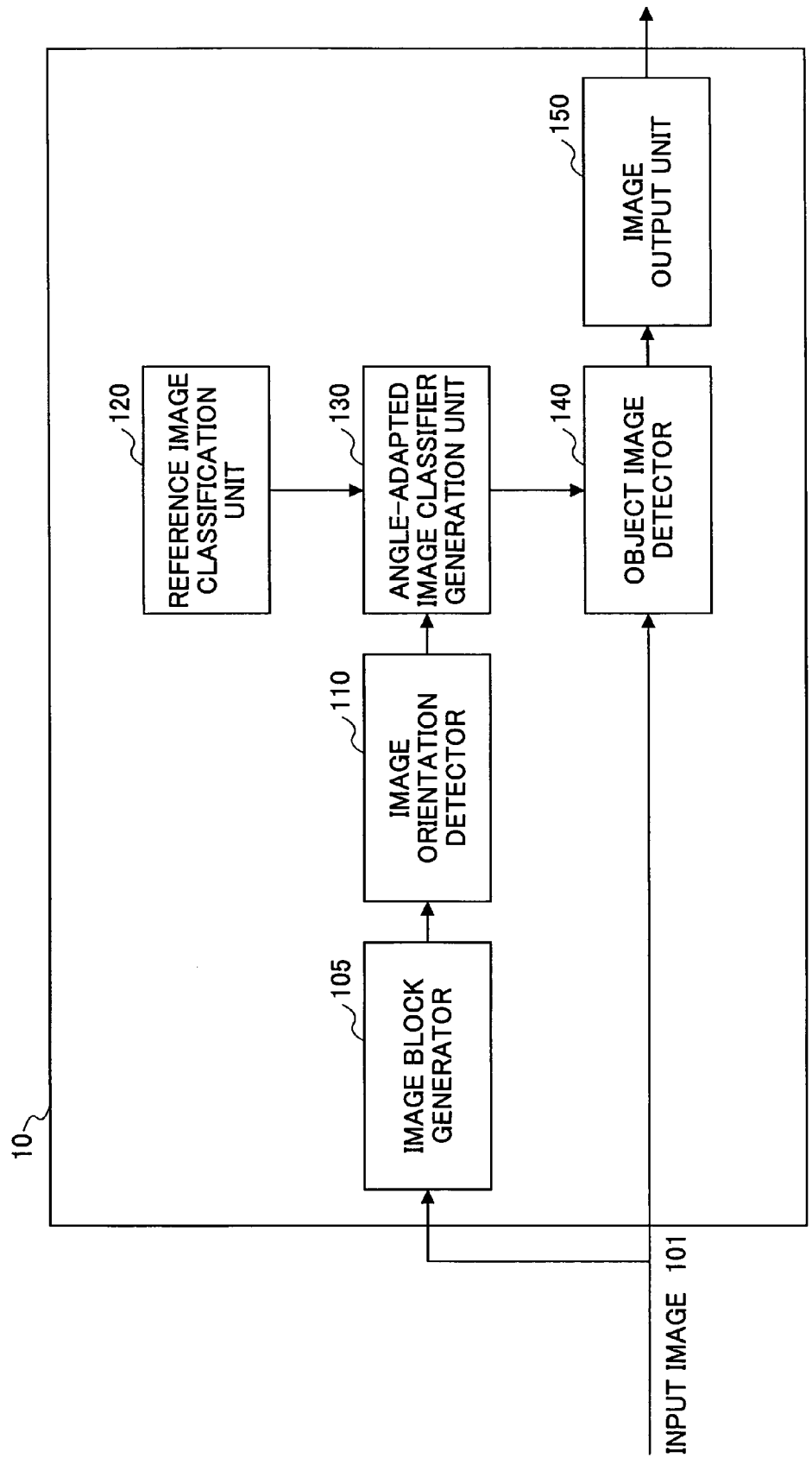
FIG. 3 is a block diagram illustrating an object image detection device according to an embodiment of the present invention.

FIG. 3 is a block diagram illustrating an object image detection device according to an embodiment of the present invention.

For example, the object image detection device according to the present embodiment is installed in a digital camera or other portable digital devices, and when taking pictures of figures or a view, the object image detection device detects faces of the figures, or characteristic portions of the view, and uses the detection results for focusing, exposure, white color balance, or other adjustments of the faces. In the following, for purposes of illustration, face detection is primarily used as an example. However, it should be noted that the object image detection device of the present embodiment is not limited to this application.

As shown in FIG. 3, the object image detection device 10 of the present embodiment includes an image block generator 105, an image orientation detector 110, a reference image classification unit 120, an angle-adapted image classifier generation unit 130, an object image detector 140, and an image output unit 150.

For example, an image sensor of a digital camera captures an image 101 of a subject of shooting, and outputs signals of the image 101 to the object image detection device 10. Below, this image is referred to as "input image 101", and this signal is referred to as "input image signal".

Figure 4:
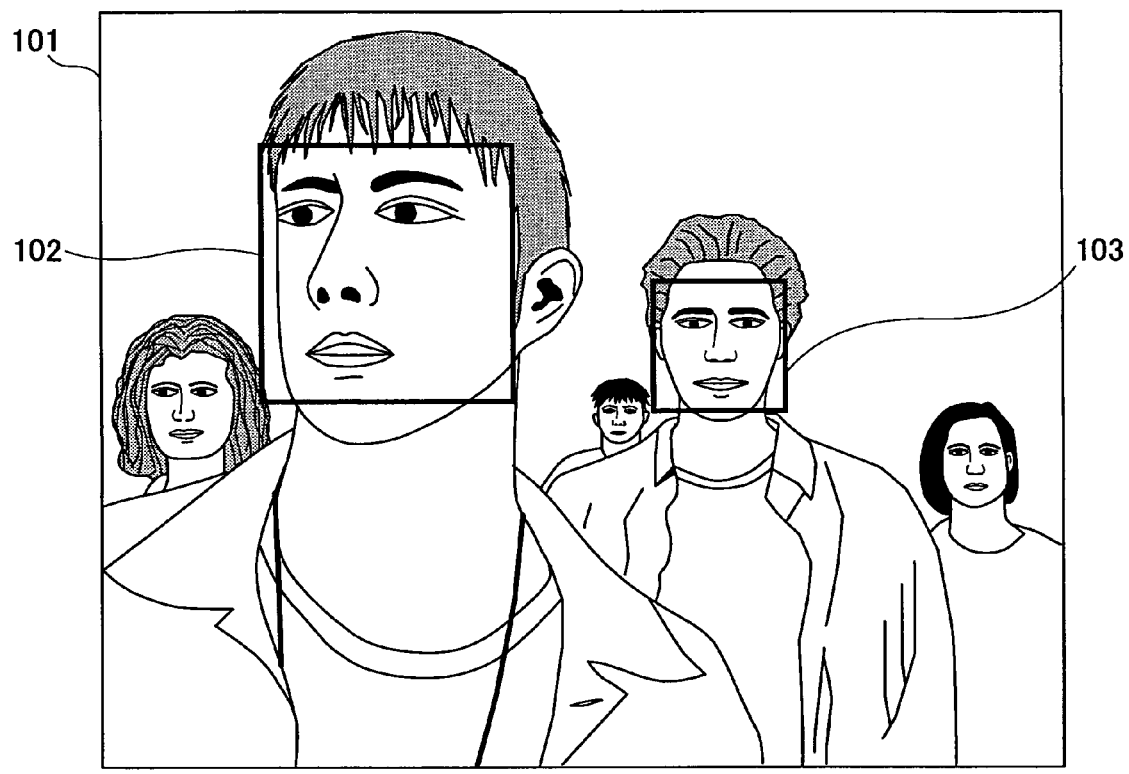
FIG. 4 is a diagram illustrating the input image 101.

FIG. 4 is a diagram illustrating the input image 101.

As shown in FIG. 4, there are face images 102, 103, and so on in the input image 101.

The image block generator 105, in order to detect object images such as face images in the input image 101, divides the input image 101 into plural image blocks to generate an image block group of the input image 101, and it is detected in the subsequent procedure whether the object images exist in each of the image blocks.

The image blocks can be generated in various ways. For example, a rectangular window having a given size is applied on the input image 101, and the image area covered by the window is defined as an image block. Then, the window is moved successively at a given step size to scan the input image 101, the image areas covered by the window at different positions are extracted as image blocks. In doing so, image blocks at different positions of the input image 101 are generated, and this enables detection of face images at different positions.

In addition, the size of the input image 101 may be reduced or enlarged to obtain a series of images having different sizes, and to form an image pyramid structure of the input image 101 with the series of images having different sizes. In this case, instead of the input image 101, the image block generator 105 receives each of the images on different layers of the image pyramid structure, and divides the each of the images on different layers into plural image blocks to generate a series of image block groups of the input image 101. In this case, since the images in the different layers of the image pyramid structure have different sizes, the image block generator 105 can use the same rectangular window having a given size to detect face images of different sizes in the input image 101.

For example, the input image 101 has 320×240 pixels, the image block has 20×20 pixels, and the step size in the horizontal and vertical directions is 3 pixels.

Figure 1A:
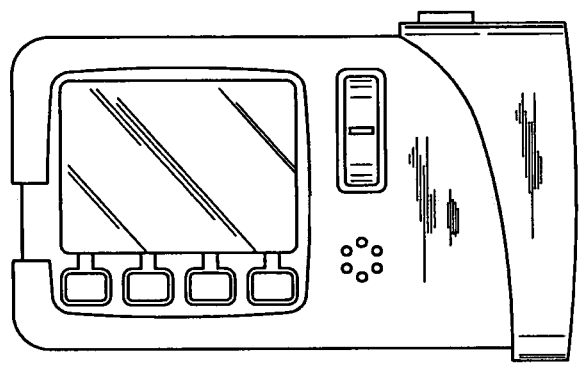
FIG. 1A through FIG. 1C illustrate different orientations of the digital camera.
Figure 1B:
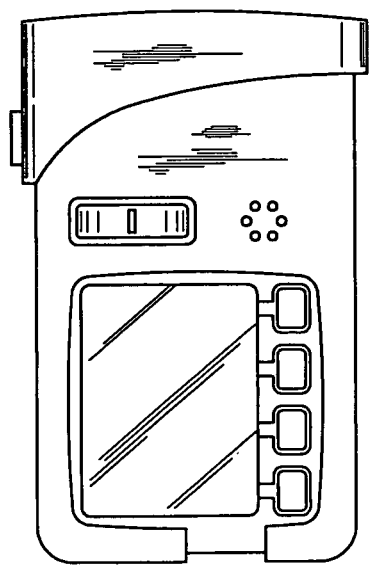
Figure 1C:
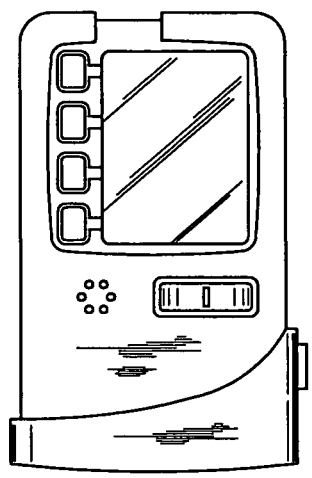
Figure 2A:
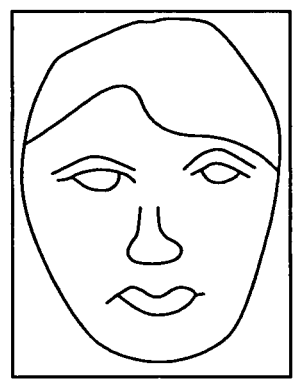
FIG. 2A through FIG. 2C illustrate face images having different orientations.
Figure 2B:
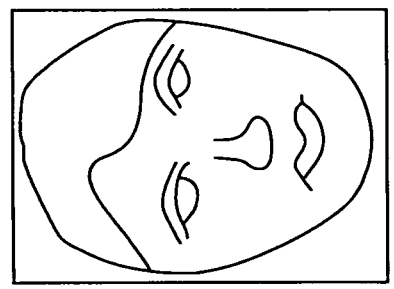
Figure 2C:
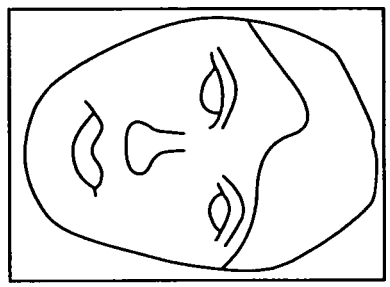

When using a digital camera, depending on situations, a user may incline the digital camera to take pictures, and in this case, the obtained pictures are inclined relative to the monitor of the digital camera compared to a normal condition in which the monitor of the digital camera is not inclined but held in a horizontal direction. As already described with reference to FIG. 1A through FIG. 1C and FIG. 2A through FIG. 2C, depending on the orientations of the digital camera, image data input into the object image detection device may be inclined at different angles. In addition to the three directions shown in FIG. 2A through FIG. 2C, for example, when taking pictures, turning the face up or down, or turning the face left or right may cause the face image to be inclined. Below, inclination of the face image, or orientation of the face image is also referred to as "angle of the face image" where necessary.

The image orientation detector 110 detects the angle of the face image in the input image 101.

In many cases, an inclined face image has an angle equaling one of a number of given inclination angles. Below, it is assumed that the angle of the inclined face image equals one of n known angles, and the image orientation detector 110 detects the angle of the face image in the input image 101 from the n known angles.

For example, when n=2, namely, the face image may have one of two given angles, it is sufficient that the image orientation detector 110 be able to distinguish these two angles. Below, a unit able to distinguish two angles is referred to as "an angle classifier".

When n>2, namely, the face image may have one of three or more given angles, in the related art, usually, an image angle detector is configured to be able to distinguish any two of the three or more given angles. Since the number of combinations of two angles out of n angles equals n(n−1)/2, the image angle detector of the related art should have n(n−1)/2 angle classifiers; and when n is large, the image angle detector requires a large amount of computation and a large memory capacity for identifying angles.

In the present embodiment, as described below, the image orientation detector 110 is configured to have only (n−1) angle classifiers to identify the angle of the face image from n given angles; in the image orientation detector 110, one of the n given angles is used as a reference angle R; the angle of the face image to be identified by the image orientation detector 110 is denoted to be θ.

The configuration of the image orientation detector 110 is described below in detail.

The reference image classification unit 120 is adapted to the reference angle R, that is, the reference image classification unit 120 is adapted to detect face images inclined at the reference angle R.

The reference image classification unit 120 uses a number of parameters to detect the face images inclined at the reference angle R. For example, the parameters may include face feature parameters, face feature weighting factors, threshold values, and so on. Among these parameters, some of them are angle-sensitive and the others are not angle-sensitive.

The configuration of the reference image classification unit 120 is described below in detail.

The angle-adapted image classifier generation unit 130 reads the parameters used in the reference image classification unit 120 and the angle θ of the face image in the input image 101 output from the image orientation detector 110, and rotates the parameters used in the reference image classification unit 120 in response to the angle θ, thereby, generating an image classification unit adapted to the angle θ, that is, generating an image classification unit adapted to detect face images inclined at the angle θ.

The object image detector 140 detects whether face images exist in the input image by using the image classification unit adapted to the angle θ; and if they exist, extracts position, size, and other information of face features.

The configuration of the object image detector 140 is described below in detail.

The image output unit 150 displays the face images detected by the object image detector 140.

Next, the configuration of the image orientation detector 110 is described with reference to FIG. 5.

Figure 5:
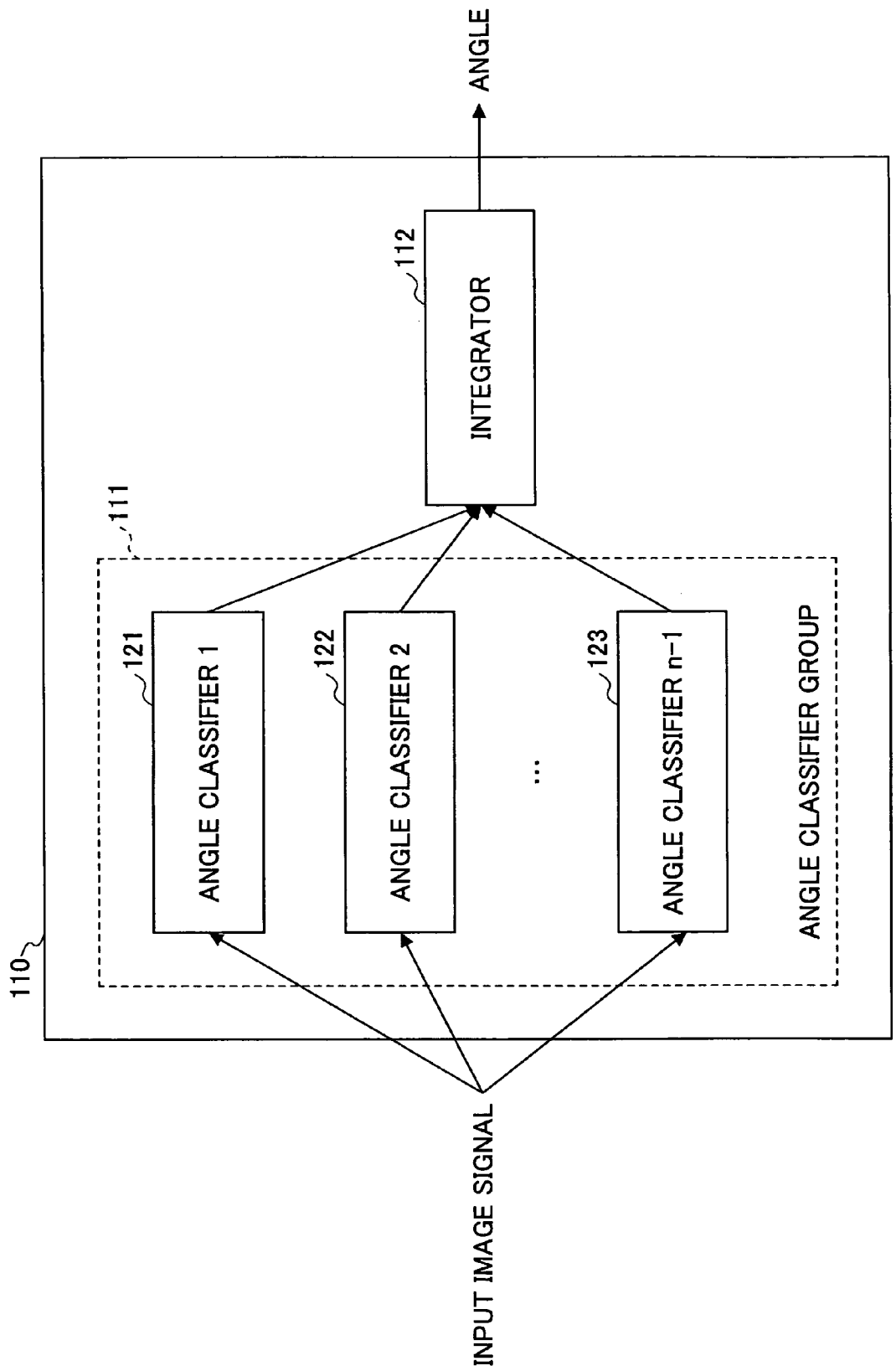
FIG. 5 is a block diagram illustrating a configuration of the image orientation detector 110 according to the present embodiment of the present invention.

FIG. 5 is a block diagram illustrating a configuration of the image orientation detector 110 according to the present embodiment of the present invention.

As shown in FIG. 5, the image orientation detector 110 has (n−1) angle classifiers 121, 122, and 123, and an integrator 112 for integrating outputs of the angle classifiers 121, 122, and 123. The angle classifiers 121, 122, and 123 are collective referred to as "an angle classifier group 111".

Each of the (n−1) angle classifiers 121, 122, and 123 distinguishes one of the other (n−1) candidate angles of the n given angles other than the reference angle R, and selects one resulting angle. The (n−1) resulting angles of the (n−1) angle classifiers 121, 122, and 123 are represented by θi (i=1, 2, . . . , n−1). In addition, the (n−1) angle classifiers 121, 122, and 123 calculate a reliability level Bi (i=1, 2, . . . , n−1) of the (n−1) selections of the (n−1) angles θi (i=1, 2, . . . , n−1), respectively.

The (n−1) angles θi (i=1, 2, . . . , n−1) selected by the angle classifiers 121, 122, and 123 and the reliability level Bi (i=1, 2, . . . , n−1) of the selections are input to the integrator 112.

Among the (n−1) angles θi (i=1, 2, . . . , n−1) selected by the angle classifiers 121, 122, and 123, some angles are probably inconsistent with others. The integrator 112 eliminates the inconsistency of the resulting angles, and obtains one resulting angle θ. This angle θ is regarded as the final classification result of the angle of the face image in the input image 101. For example, the integrator 112 selects an angle θi having the largest reliability level Bi as the final classification result θ.

The angle classifiers 121, 122, and 123 can be implemented by various methods. In the present embodiment, each of the angle classifiers 121, 122, and 123 can be implemented by a boosting classifier, and identifies face features by the method disclosed in reference 3. That is, values of Harr wavelet features are used for image classification.

Specifically, for example, the angle classifier 121 detects the angle of a face image by using features of the face image. A face feature (also referred to as "a Harr feature") is a characteristic portion of the face image covered by a rectangular window. The angle classifier 121 uses one set of face features (Harr features) to distinguish one angle of the (n−1) candidate angles from the reference angle R.

The set of face features (Harr features) used by each of the angle classifiers 121, 122, and 123 serves as one sub-angle classifier. When the value fj (j=1, 2, . . . , m, where m is the number of the face features in the set of face features) of a face feature is greater than a threshold μ of the sub-angle classifier, the identification result (output) hj of the sub-angle classifier equals 1. For example, the value fj of the face feature may be the position of the rectangular window, namely, the position of the face feature.

When the value fj of the face feature is less then the threshold μ of the sub-angle classifier, the identification result (output) hj of the sub-angle classifier equals 0.

Each of the sub-angle classifiers is assigned a weight factor αj, and the weighted sum Si of the output hj of the sub-angle classifiers, namely, Si=Σαj·hj is a feature quantity of the i-th angle classifier.

Threshold values Ti (i=1, 2, . . . , n−1) are assigned to the (n−1) angle classifiers 121, 122, and 123, respectively. When the feature quantity Si of the i-th angle classifier is greater than the threshold value Ti of the i-th angle classifier, the angle classifier decides that the angle of the face image equals the reference angle R; whereas, when the feature quantity Si of the i-th angle classifier is less than the threshold value Ti of the i-th angle classifier, the angle classifier decides that the angle of the face image equals the corresponding one of the (n−1) given angles, and this resulting angle is denoted to be θi. Further, the absolute value of the difference between the feature quantity Si and the threshold value Ti is used as the reliability level Bi of the angle classifier, and the larger the reliability level Bi, the higher reliability level of the identification result.

In the boosting classifier, values of the parameters f, μ, α, T are decided using a training sample. For example, a sample is collected to form the training sample, which includes a certain number of face images having angle equaling the reference angle R and a certain number of face images having angle other than the reference angle R.

In this way, the (n−1) angle classifiers 121, 122, and 123 are derived.

Figure 6:
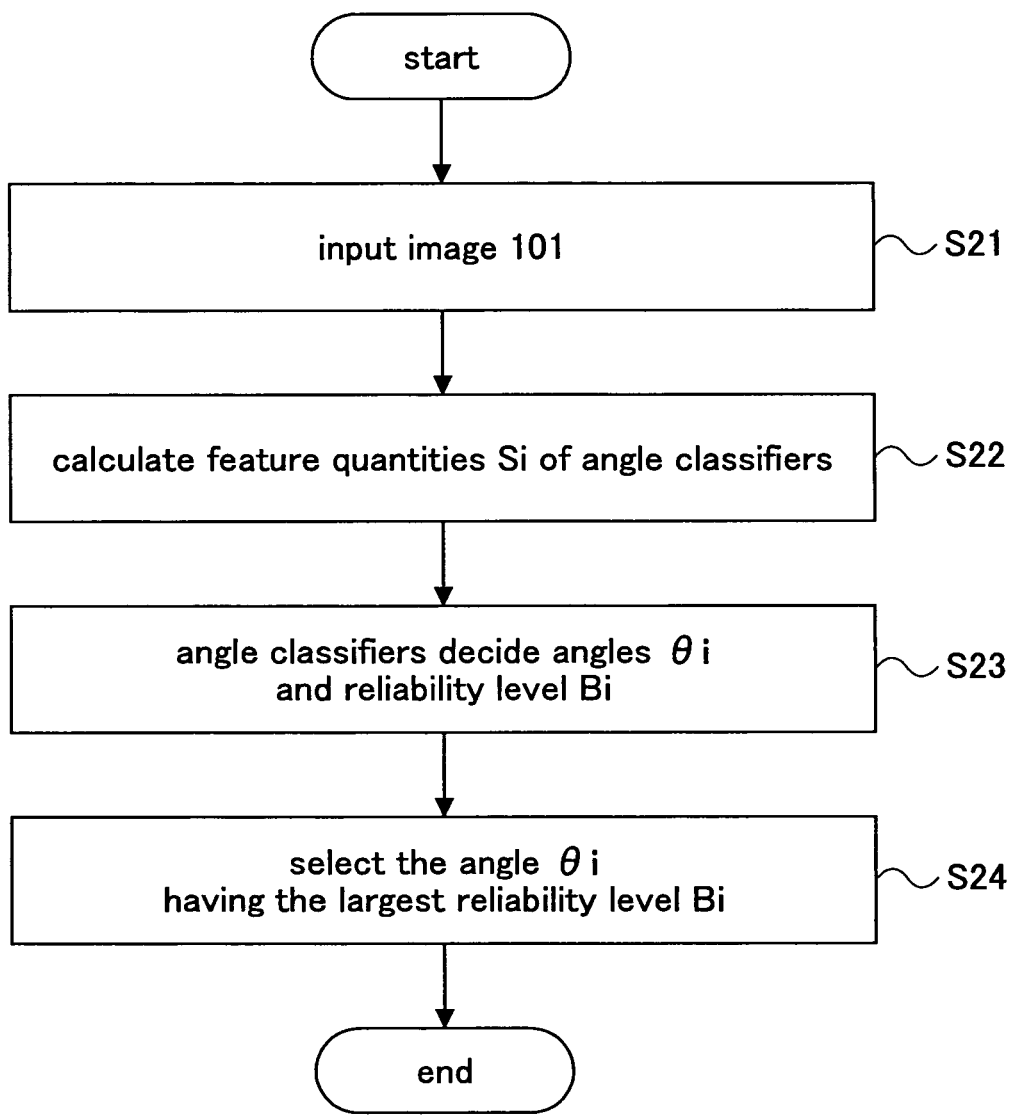
FIG. 6 is a flowchart illustrating operations of the image orientation detector 110.

FIG. 6 is a flowchart illustrating operations of the image orientation detector 110.

As shown in FIG. 6, in step S21, the input image 101 is input to the image orientation detector 110.

In step S22, the feature quantities Si (i=1, 2, . . . , n−1) of the angle classifiers 121, 122, and 123 are calculated.

In step S23, the angle classifiers 121, 122, and 123 decide on the angles θi (i=1, 2, . . . , n−1), respectively.

In step S24, the angle θi having the largest reliability level Bi is selected to be the final classification result θ.

Next, the configuration of the reference image classification unit 120 is described with reference to FIG. 7.

Figure 7:
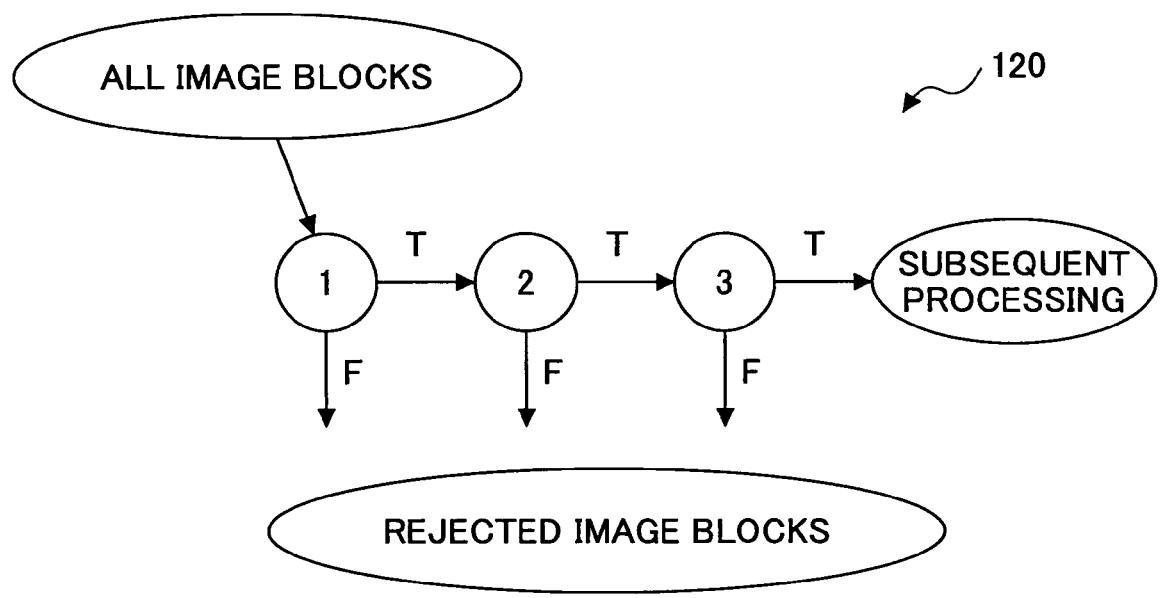
FIG. 7 is a block diagram illustrating a configuration of the reference image classification unit 120 according to the present embodiment of the present invention.

FIG. 7 is a block diagram illustrating a configuration of the reference image classification unit 120 according to the present embodiment of the present invention.

As shown in FIG. 7, in the present embodiment, the reference image classification unit 120 is implemented by a cascade boosting image classifier, namely, the reference image classification unit 120 includes a series of Boosting image classifiers.

Each stage of the boosting image classifier detects the face image by using features of the face image, and the method disclosed in reference 3 is used to detect the face images.

Figure 8:
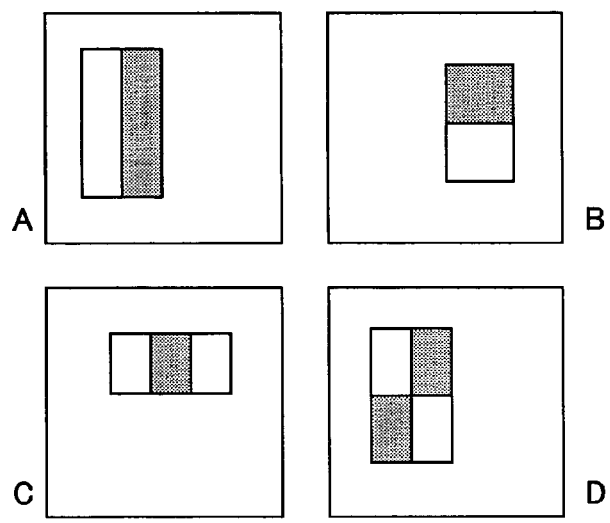
FIG. 8 is a diagram illustrating Harr wavelet features for face detection.

FIG. 8 is a diagram illustrating Harr wavelet features for face detection.

In FIG. 8, A, B, C, and D are a two-rectangle feature, a two-rectangle feature, a three-rectangle feature, and a four-rectangle feature, respectively, and the large rectangles are the windows for object image detection; that is, each of the large rectangles represents an image block.

In the two-rectangle feature A, the two rectangles have the same size and shape and are horizontally adjacent, and in the two-rectangle feature B, the two rectangles are vertically adjacent. The value of a two-rectangle feature is the difference between the sum of the pixels within two rectangular regions. Specifically, the sum of the pixels which lie within the white rectangle are subtracted from the sum of the pixels which lie within the grey rectangle.

The three-rectangle feature computes the sum within two outside rectangles subtracted from the sum in a center rectangle, and the four-rectangle feature computes the difference between diagonal pairs of rectangles.

Returning to FIG. 7, valid image blocks are input to the reference image classification unit 120. For example, the reference image classification unit 120 includes three stages of boosted image classifiers, and the three stages of classifiers are applied to every input image block sequentially. The boosted image classifiers can be constructed to reject many of the negative rectangle features (refer to FIG. 8) while detecting almost all positive instances. For example, the first stage in the cascade may be a two-feature classifier, and the threshold T is assigned to the classifier to yield a specified error rate (F, stands for False), which indicates that highly probably a face image is not included in the input image block, and a positive rate (T, stands for True), which indicates that highly probably a face image is included in the input image block. A positive result (T) from the first-stage classifier (that is, the value f of features is greater than the assigned threshold T) triggers the evaluation of a second-stage classifier which has also been adjusted to achieve very high detection rates. The image blocks which are not rejected by the first-stage classifier are processed by the second-stage classifier, which is more complex than the first-stage classifier. A positive result (T) from the second-stage classifier triggers the evaluation of a third-stage classifier. When all of the three-stage classifiers give positive results (T), the reference image classification unit 120 determines that a face image is included in the input image block, and the input image block is regarded as a face image candidate.

On the other hand, a negative outcome (F) at any point leads to immediate rejection of the image block, and no further processing is performed.

Each of the three classifiers as shown in FIG. 7 uses the face feature value f, the face feature weighting factor α, the threshold value T of the boosted image classifiers, and other parameters. Among these parameters, the face feature value f is angle-sensitive, and the others are not angle-sensitive.

Figure 9:
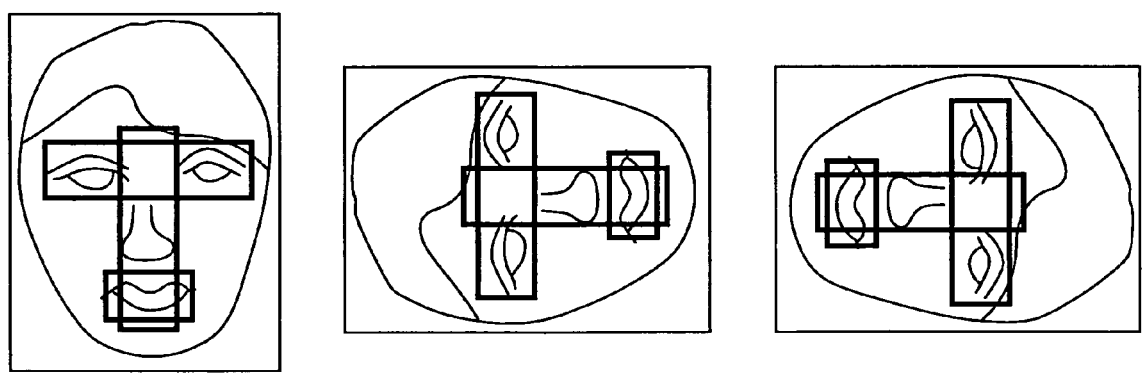
FIG. 9 contains schematic views illustrating rotation of feature parameters of the image classifier.

FIG. 9 contains schematic views illustrating rotation of feature parameters of the image classifier.

In FIG. 9, it is shown that the images input to the object image detection device 10 have three angles, that is, zero degrees (under normal condition), 90 degrees, and −90 degrees. Here, a positive angle represents rotation to the right, and a negative angle represents rotation to the left. Assume the reference angle R is zero degrees (under normal condition); that is, the reference image classification unit 120 is adapted to zero degree. When the angle of the input image is at 90 degrees or −90 degrees, the angle-adapted image classifier generation unit 130 rotates the face feature value f, which is angle-sensitive, by 90 degrees or −90 degrees, to generate an image classification unit adapted to 90 degrees or −90 degrees to detect face images inclined by 90 degrees or −90 degrees.

Figure 10:
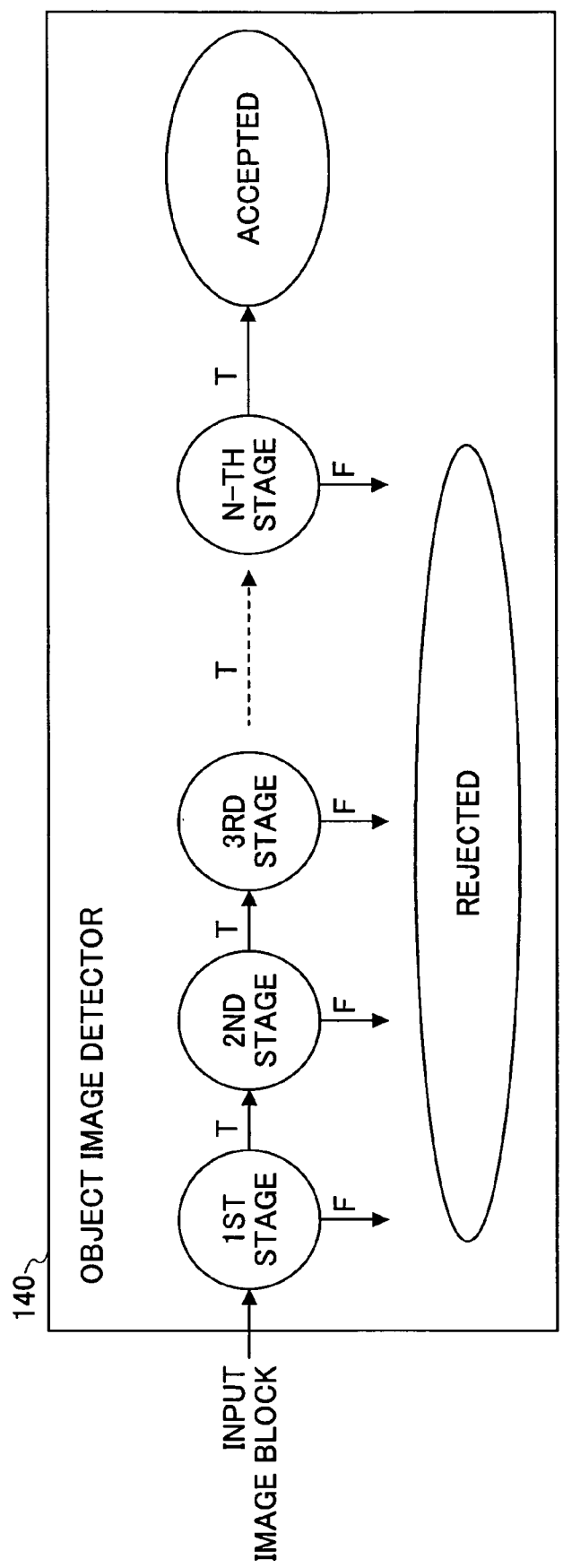
FIG. 10 is a diagram illustrating a configuration of the object image detector 140 according to the present embodiment.

FIG. 10 is a diagram illustrating a configuration of the object image detector 140 according to the present embodiment.

As shown in FIG. 10, in the present embodiment, the object image detector 140 is composed of a cascade boosting image classifier, and the method disclosed in reference 3 is used to detect the object images; that is, Harr wavelets are used as features in face detection, and the value of the Harr wavelet feature is used for image classification.

The object image detector 140 includes N stages of boosted image classifiers, and the N stages of classifiers are applied to every input image block sequentially. The boosted image classifiers can be constructed to reject many of the negative rectangle features (refer to FIG. 8) while detecting almost all positive instances. For example, the first stage in the cascade may be a two-feature classifier, and a threshold is assigned to the classifier to yield a specified error rate (F, stands for False), which indicates that highly probably a face image is not included in the input image block, and positive rate (True), which indicates that highly probably a face image is included in the input image block. A positive result (T, stands for True) from the first-stage classifier (that is, the value of features is greater than the assigned threshold) triggers the evaluation of the second stage classifier which has also been adjusted to achieve very high detection rates. The image blocks which are not rejected by the first-stage classifier are processed by the second-stage classifier, which is more complex than the first-stage classifier. A positive result (T) from the second-stage classifier triggers the evaluation of a third-stage classifier, and so on. When all of the N-stage classifiers give positive results (T), the object image detector 140 determines that a face image is included in the input image block, and the input image block is regarded as a face image candidate.

On the other hand, a negative outcome (F) at any point leads to immediate rejection of the image block, and no further processing is performed.

Operations of the object image detection device 10 are described below.

FIG. 11 is a flowchart illustrating operations of the object image detection device 10.

In step S1, the image 101 of a subject of shooting captured by an image sensor of a digital camera is input to the object image detection device 10.

In step S2, the image orientation detector 110 detects the angle θ of the face image in the input image 101.

In step S3, the angle-adapted image classifier generation unit 130 rotates the parameters used in the reference image classification unit 120 in response to the angle θ of the face image in the input image 101 output from the image orientation detector 110 to generate an image classification unit adapted to the angle θ, which is adapted to detect face images inclined at the angle θ.

In step S4, the object image detector 140 detects whether face images exist in the input image by using the image classification unit adapted to the angle θ, and if exist, extracts positions, size, and other information of the face images. The image output unit 150 displays the face images detected by the object image detector 140.

According to the above embodiments of the present invention, instead of rotating the input images having various inclined angles, the angle-adapted image classifier generation unit 130 is provided to rotate the reference image classification unit 120 in response to the angle of the face image to generate image classifiers for the various inclined angles. Since rotation of the object image classification unit does not require a large amount of computation, the amount of computation is greatly reduced, and the speed of object image detection is greatly increased, thus it is possible to rapidly detect object images without a great deal of computation.

Further, in the above embodiments of the present invention, the reference image classification unit 120 is provided which is adapted to detect face images inclined by the reference angle R; in addition, the parameters used in the reference image classification unit 120 are grouped into angle-sensitive parameters and angle-insensitive parameters; when the image orientation detector 110 obtains the angle θ of the face image in the input image 101, the angle-sensitive parameters are rotated according to the angle θ of the face image to generate an image classification unit adapted to the angle θ. Hence, it is sufficient to store only one image classifier (namely, the reference image classification unit 120) in the memory, and it is not necessary to store plural image classifiers respectively corresponding to the given inclination angles. Therefore, the required memory capacity is greatly reduced.

Further, since only one image orientation detector 110 having a simple configuration is provided to detect the angle of the face image in the input image 101, computation can be performed much efficiently. For example, when the angle of the inclined face image equals one of n known angles, and the image orientation detector 110 detects the angle of the face image in the input image 101 from the n known angles, the computation efficiency is very high compared to the related art.

While the present invention is described with reference to specific embodiments chosen for purpose of illustration, it should be apparent that the invention is not limited to these embodiments, but numerous modifications could be made thereto by those skilled in the art without departing from the basic concept and scope of the invention.

For example, in the above embodiments, description is made primarily with face detection as an example. However, the present invention is not limited to this, but can be applied to detection of other object images, like cars or roads.

The configuration of the reference image classification unit 120 is not limited to the above embodiments. The reference image classification unit 120 can have any configuration as long as it can be adapted to detect object images inclined at a different specified angle by adjusting parameters.

In the above embodiments, it is described that the object image detector 150 includes a cascade boosting image classifier. However, the present invention is not limited to this. Any method enabling detection of object images based on features of the object images is applicable. For example, when detecting face images, face detection based on template matching or on skin color may be used.

What is claimed is:

1. An object image detection device for detecting one or more object images from an input image, comprising:
   a reference object image classification unit configured to determine whether an object image is included in an image having a predetermined orientation;
   an image orientation detection unit configured to detect an orientation of the input image;
   an image rotation unit configured to read parameters used in the reference object image classification unit and an angle of object images of the reference image classification unit and rotate the parameters in response to the angle of the object images to generate an image classification unit adapted to the detected orientation; and
   a detection unit configured to detect and extract at least one of position information and size information of the object images from the input image based on the generated image classification unit for display on an image output unit.

2. The object image detection device as claimed in claim 1, wherein the image orientation detection unit detects the orientation of the input image by using one or more features of the object image.

3. The object image detection device as claimed in claim 1, wherein
   the object image classification unit includes a plurality of image classifiers arranged in cascade manner, and
   the image rotation unit rotates at least a part of the image classifiers of the object image classification unit according to the detected orientation of the input image.

4. The object image detection device as claimed in claim 1, wherein the image orientation detection unit includes a plurality of direction identifiers each able to distinguish two angles from the others.

5. The object image detection device as claimed in claim 1, wherein
   the image orientation detection unit includes an integration section configured to integrate outputs of the direction identifiers.

6. The object image detection device as claimed in claim 1, wherein
   the image rotation unit rotates the object image classification unit by adjusting direction-sensitive parameters of the object image classification unit according to the detected orientation of the input image.

7. The object image detection device as claimed in claim 6, wherein the direction-sensitive parameters include positions of features of the object image.

8. An object image detection method for detecting one or more object images from an input image, comprising:
   inputting an image into an object image detecting device;
   an image orientation detection step for detecting an orientation of the input image using an image orientation detector;
   an image rotation step including reading parameters used in the reference object image classification unit and an angle of object images of the reference image classification unit for rotating parameters used in a reference image classification unit in response to the angle of the object images to generate an image classification unit adapted to the detected orientation; and
   an object image classification step for detecting and extracting at least one of position information and size information of the object image from the input image based on the rotated parameters used in the object image classification.

9. The object image detection method as claimed in claim 8, wherein in the image orientation detection step, the orientation of the input image is detected by using one or more features of the object image.

10. The object image detection method as claimed in claim 8, wherein in the object image classification step, a plurality of image classifiers arranged in cascade manner is used to determine whether the object image is included in the input image, and in the image rotation step, at least a part of the image classifiers are rotated according to the detected orientation of the input image.

11. The object image detection method as claimed in claim 8, wherein in the image orientation detection step, a plurality of direction identifiers each able to distinguish two angles from the others is used to detect the orientation of the input image.

12. The object image detection method as claimed in claim 11, wherein in the image orientation detection step, outputs of the direction identifiers are integrated.

13. The object image detection method as claimed in claim 8, wherein in the image rotation step, among the parameters used in the object image classification step, only direction-sensitive parameters are adjusted according to the detected orientation of the input image.

14. The object image detection method as claimed in claim 13, wherein the direction-sensitive parameters include positions of features of the object images.

15. A non-transitory program product, which when read and executed by a computer, performs an object image detection method for detecting one or more object images from an input image, said method comprising:

an image orientation detection step for detecting orientation of the input image;

an image rotation step including reading parameters used in the reference object image classification unit and an angle of object images of the reference image classification unit for rotating parameters used in a reference image classification unit in response to the angle of the object images to generate an image classification unit adapted to the detected orientation; and an object image classification step for detecting and extracting at least one of position information and size information of the object image from the input image based on the rotated parameters used in the object image classification.

16. The non-transitory program product as claimed in claim 15, wherein in the image orientation detection step, the orientation of the input image is detected by using one or more features of the object image.

17. The non-transitory program product as claimed in claim 15, wherein in the object image classification step, a plurality of image classifiers arranged in cascade manner is used to determine whether the object image is included in the input image, and in the image rotation step, at least a part of the image classifiers are rotated according to the detected orientation of the input image.

18. The non-transitory program product as claimed in claim 15, wherein in the image orientation detection step, a plurality of direction identifiers each able to distinguish two angles from the others is used to detect the orientation of the input image.

19. The non-transitory program product as claimed in claim 18, wherein in the image orientation detection step, outputs of the direction identifiers are integrated.

20. The non-transitory program product as claimed in claim 15, wherein in the image rotation step, among the parameters used in the object image classification step, only direction-sensitive parameters are adjusted according to the detected orientation of the input image.

* * * * *